United States Patent [19]

Stanforth et al.

[11] Patent Number: 5,827,574
[45] Date of Patent: Oct. 27, 1998

[54] METHOD OF NONHAZARDOUS REMOVAL OF PAINT CONTAINING HEAVY METALS AND COATING PREPARATION FOR PERFORMING THE SAME

[75] Inventors: Robert R. Stanforth, Singapore, Singapore; Paul V. Knopp, Cross Plains, Wis.

[73] Assignee: RMT, Inc., Madison, Wis.

[21] Appl. No.: 871,043

[22] Filed: Jun. 9, 1997

Related U.S. Application Data

[62] Division of Ser. No. 635,516, Apr. 22, 1996, Pat. No. 5,637,355.

[51] Int. Cl.$^6$ ........................................................ B05D 3/12

[52] U.S. Cl. ............................ 427/341; 427/355; 451/39; 134/4; 134/6; 134/7; 134/38; 588/236; 210/912

[58] Field of Search ...................................... 427/337, 340, 427/341, 355; 451/38, 39; 134/4, 6, 7, 38; 588/236; 423/89; 210/912

[56] References Cited

U.S. PATENT DOCUMENTS

| 4,731,125 | 3/1988 | Carr | 134/17 |
| 5,037,479 | 8/1991 | Stanforth | 106/691 |
| 5,591,116 | 1/1997 | Pierce | 588/256 |
| 5,667,696 | 9/1997 | Studer et al. | 210/702 |
| 5,674,176 | 10/1997 | Pierce | 588/256 |

*Primary Examiner*—Erma Cameron
*Attorney, Agent, or Firm*—Andrus, Sceales, Starke & Sawall

[57] ABSTRACT

The present invention involves a method of removing paint containing heavy metal from a surface without the production of hazardous wastes. Specifically, this method involves applying a coating preparation to the heavy metal containing paint prior to its removal from its surface. The preparation contains lead reactive chemicals such as phosphates, metal sulfides and organic sulfides. The preparation may also contain buffers such as magnesium oxide and magnesium hydroxide. These chemicals react with the heavy metals rendering them nonhazardous. The invention also involves the coating preparation itself.

16 Claims, No Drawings

METHOD OF NONHAZARDOUS REMOVAL OF PAINT CONTAINING HEAVY METALS AND COATING PREPARATION FOR PERFORMING THE SAME

This application is a divisional of application No. 0,635,516, filed Apr. 22, 1996 now U.S. Pat. No. 5,637,355.

BACKGROUND OF THE INVENTION

Elimination of hazardous material is gaining more attention due to the new Environmental Protection Agency (EPA) laws imposed because of the extreme toxicity of many of these waste products. Wastes from lead paint removal are often hazardous due to the high lead content as well as zinc, cadmium, copper, nickel, barium and other heavy metals present. Handling and disposal of these hazardous wastes is far more complicated and expensive than if there were nonhazardous. Thus, it could be extremely beneficial if the lead paint could be rendered nonhazardous prior to its removal from the surface it is on. This would eliminate the production of hazardous wastes thereby avoiding the requirement of adhering to strict EPA regulations since no hazardous wastes are ever produced. This would reduce costs greatly and simplify the methods of handling and disposal of the resulting nonhazardous waste.

A method of rendering the lead paint nonhazardous is via a treatment process which introduces an additive that renders metals to a nonhazardous form to a coating preparation formula. This coating preparation could then be applied over the existing lead paint before the lead paint is removed from the surface. The lead paint is thereby rendered nonhazardous before it is removed from its surface and becomes a waste material.

This process has numerous advantages. First, the additive is in intimate contact with the lead-bearing (or other heavy metal-bearing) paint, since they are removed together, and there will be no question of achieving sufficient mixing between the paint waste and the additives.

Second, since the paint is treated before it is removed from the surface, the generation of a hazardous waste is eliminated. The treated waste will need to be disposed in accordance with local, state, and federal regulations regarding solid waste disposal, but it will not need to be handled as a hazardous waste. Thus, this treatment process reduces the amount of EPA regulation and reduces time consuming EPA filing requirements.

Third, since the additive is introduced on top of the existing paint surface, the underlying surface after removal should be unaffected by the treatment process. In other words, the waste treatment will not effect the underlying surface with regards to future painting.

Yet another advantage is since this technique eliminates the generation of hazardous waste it will reduce both the short-term cost and long-term liability for anyone with lead painted items and, or course, it provides intangible benefit of the manifesting requirements of a hazardous waste generator.

Another advantage is that the application procedure to the lead painted surface is extremely simple and thereby reduces the potential for human error.

DESCRIPTION OF THE INVENTION

The present invention involves a method of removing paint containing heavy metal from a surface without the production of hazardous wastes. Specifically, this method involves applying a coating preparation to the paint containing heavy metal prior to its removal, as illustrated in Table 2. The coating primarily contains any number of forms of phosphate as the key lead-reactive (heavy-metal reactive) material. The preferred containing preparation may also contain other additives such as buffers, binders, solvents, and pigments in addition to the phosphate. The invention also involves the coating preparation in combination with the additive itself.

Examples of phosphate compounds within the scope of this invention include triple super phosphate (TSP). Other forms of phosphate in addition to TSP are effective for treating the waste, such as a group of phosphorus containing chemicals such as calcium phosphate, single super phosphate, trisodium phosphate, or phosphoric acid. The lead reactive chemicals may also include metal sulfides such as barium sulfide, zinc sulfide and organic sulfide such as sodium dithiocarbamate. These chemicals react with the heavy metals rendering them nonhazardous.

Phosphate, alone or in combination, with buffers such as magnesium oxide or magnesium hydroxide, separately or in combination, is introduced to lead (or other heavy metal) containing paint prior to paint removal thereby rendering waste created from the process nonhazardous.

The preferred method of treatment is to introduce the additives in a liquid or gel form that is applied to the surface of the paint. The additives could be introduced to the paint by any type of preparation which acts as a carrier. Introduction of the additives could be accomplished by utilizing a preparation which is in a liquid, gel or slurry form that will allow a thin layer of these additives to be placed over and remain on the surface of the lead paint. The preparation should preferably be inexpensive, quick drying and strongly adhere to paint surface.

Generally, the preparation could be any type of paint stripping solution. The coating preparation containing the additives could also be any type of paint, a paint matrix, a paint stripper, or simply a quick drying slurry. The inventors have found that the treatment additives can even be added to a standard commercial water-based paint.

Specifically, the coating preparation may contain a mixture of the additives including a lead reactive chemical, a binder, a solvent, (or combination of solvents), pigments, and buffering compounds such that the mixture is sprayable or blowable with commercially available spraying equipment and blow coating equipment. The combination of the aforementioned additives will dependent upon the site-specific conditions of application and the economic combination of the same. The lead reactive chemical can be a phosphate in the form of TSP, calcium phosphate, single superphsophate, etc. as outlined above. Additionally, the lead reactive material may also include the aforementioned metal sulfides or organic sulfides. The concentration of the lead reactive chemicals would range from 5% by weight to 50% by weight.

The binders, which may be used alone or in combination, may include a wide variety of polymers such as acrylic resins, polyester resins, epoxy resins, polyether resins, alkylide resins, urethane and polyurethane resins.

The solvents include water, alcohols, glycol ethers, glycols and also xylene, toluene, acetone, methyl-ethyl ketone, methyl-150-butyl based ketone, and mineral spirits. Again, these may be used alone or in combination.

Pigments (utilized alone or as a mixture) may be any commercial paint pigment such as titanium dioxide, calcium carbonate, silica, or aluminum oxide, the purpose of which is to show coverage and to regulate the elasticity of the coating.

The buffering compounds may consist of magnesium oxide, magnesium hydroxide, ammonia, organic amines, such as triethylamine, and triethanoyamin utilized alone or as a buffering mixture. The concentration of buffer selected may range from 5%–30% by weight. The primary purpose of the magnesium oxide or magnesium hydroxide is to buffer the pH of the treated waste in the region of minimum solubility of lead phosphate (i.e. pH 8–10). Even if the dosage of magnesium oxide/hydroxide is too low to reach a pH in the 8–10 range, any amount of buffer will raise the pH somewhat, which will decrease the solubility of the lead.

Typically, commercial binders may be augmented with the lead reactive chemicals and buffering compounds to formulate a coating which meets the above requirements. For example, a commercial available latex binder and solvent would be augmented with the lead reactive chemicals and a buffer.

After application, the lead paint and coating preparation are then removed from the surface using standard paint removal techniques. Techniques for removing the paint can involve surface cleaning methods ranging from the mechanical abrasion, such as scraping lead paint from an item by hand or subjecting items to the ball mill techniques to the use of strong chemicals. More delicate surfaces may require careful chemical removal to prevent damage or destruction of the substrate.

Hard, durable surfaces such as heavy steel plating can be cleaned or stripped by relatively fast abrasive methods, such as sand blasting.

Composite materials such a plastics or epoxy, which often contain fiber such as glass strands, graphite, kevlar or the like for reinforcement, may require applying a granular media substantially composed of particles of a material which has a Mohs scale hardness lower than 3.5 to remove the paint, which is outlined in U.S. Pat. No. 4,731,125 herein incorporated by reference. The granular media is accelerated using media propelling means to produce a substantially and continuous media flow on to the paint surface in order to remove the paint.

As one can see, there is a myriad of different methods for removing the lead paint (with the coating preparation) and all are contemplated as being within the scope of this invention.

This coating preparation can be applied to any surface coated with lead paint. Specifically, it can be used for outdoor surfaces of building, bridges, industrial machinery, petroleum tanks and the like. Additionally, it can be used on indoor surfaces such as walls, floors and ceilings of homes or business.

The chemistry behind this invention is based on the reaction between the lead in the paint with phosphate in the additive. Lead phosphates are among the least soluble and most stable forms of lead in the natural environment. This means that the lead, once stabilized, will remain in the phosphate form unless subjected to highly acidic (pH<4) or basic (pH>11) conditions, which are extremely uncommon in the natural environment. Since the treatment process occurs through a chemical reaction involving the lead, rather than through pH control, the regulatory agencies find it acceptable.

DETAILED DESCRIPTION OF THE PREFERRED EMBODIMENT

EXAMPLE 1

A Toxicity Characteristic Leaching Procedure (TCLP) test was utilized to determine the toxicity of the resultant waste material. The EPA standard to determine whether a waste is nonhazardous material is 5 mg per liter (ppm) lead in the material as measured by the TCLP. Specifically, this test utilizes a buffered acetic acid leach solution, which is mixed with the waste for about 18 hours. The filtrate is then analyzed for lead. If the lead level in the filtrate is >5.0 mg/l, the waste is hazardous by the characteristic of lead toxicity.

The Example 1 analysis consisted of sandblasted paint waste samples that were collected off of a sandblasted bridge. Testing of leaded paint mixed with the treated paint has shown treatment effectiveness, even with relatively low dosages of the preparation (see Table 1). Dust from paint removal from a bridge was found to be hazardous for lead (29.4 mg/L in a TCLP test versus the criteria of 5 mg/L). Addition of 5%, 10% TSP or 5% TSP and 5% MgO reduced lead in a TCLP test leachate to below the regulatory criterion of 5 mg/L and zinc concentrations were also reduced to below the state regulated criteria of 500 mg/L.

TABLE 1

BRIDGE BLASTING PAINT WASTE
TREATMENT TEST RESULTS

| | | Screening TCLP Test Results | | |
|---|---|---|---|---|
| Sample | pH | Cadmium mg/L | Lead mg/L | Zinc mg/L |
| Untreated | 5.0 | <0.3 | 29.4 | 1980 |
| +5% TSP | 5.2 | <0.15 | 2.7 | 246 |
| +10% TSP | 5.1 | <0.15 | 0.6 | 69 |
| +5% MgO & 5% TSP | 7.1 | <0.15 | <0.6 | <0.15 |
| +10% MgO & 10% TSP | 9.6 | <0.15 | <0.6 | <0.15 |

TSP - Triple super phosphate
MgO - Magnesium Oxide

TABLE 2

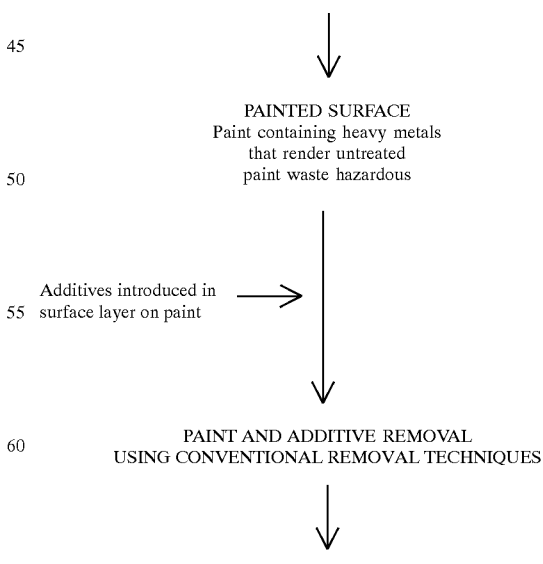

TABLE 3

SCREENING TCLP TEST RESULTS

| Product Mixture | Final pH | Extraction Fluid | TCLP Lead, mg/l |
|---|---|---|---|
| Untreated Paint Waste Residue | 5.0 | #1 | 12.5 |
| +0.2% Dry CoatingPreparation Solids | 5.0 | #1 | 4.4 |
| +0.4% Dry Coating Preparation Solids | 5.0 | #1 | 2.1 |
| +0.6% Dry Coating Preparation Solids | 5.1 | #1 | 1.0 |
| +0.8% Dry Coating Preparation Solids | 5.2 | #1 | 0.41 |
| +1.0% Dry Coating Preparation Solids | 5.2 | #1 | 0.48 |

NOTE: The screening TCLP test is modified, scaled-down TCLP leaching test that gives results that are similar to those of a standard TCLP test on the waste material. The screening test is not suitable for regulatory submittals. The treatability results demonstrate the effect of the treatment on the samples tested. Extrapolation of the results to waste streams or contaminated sites depends on the representativeness of the samples collected.

EXAMPLE 2

Another analysis seen in Example 2 was conducted of sandblasted waste samples that were collected at the Blatnik bridge in Superior, Wis. The results of TCLP tests (performed as outlined in Example 1) and compositional analysis performed on the samples was collected during the field trial test at the Blatnik bridge are listed in Table 3. Samples of untreated sandblasted waste products from the bridge site were treated with a dry material which contained approximately 30% binder and approximately a 70% magnesium oxide/TSP combination at dosages ranging from 0.2% to 1.0% by weight. The magnesium oxide/TSP combination were present in a 50%/50% ratio relative to each other.

I claim:

1. A method of removing paint containing heavy metals comprising:

introducing an additive which contains a phosphate compound and which renders a heavy metal nonhazardous, to a coating preparation;

applying said coating preparation onto a surface coated with a paint containing heavy metal;

removing said coating preparation and said paint containing heavy metal from said surface wherein said removed coating preparation and said removed paint containing heavy metal are nonhazardous as defined by the Toxicity Characteristic Leaching Procedure.

2. The method of claim 1 wherein said phosphate is triple super phosphate.

3. The method of claim 1 wherein said phosphate is calcium phosphate.

4. The method of claim 1 wherein said phosphate is single superphosphate.

5. The method of claim 1 wherein said phosphate is tri-sodium phosphate.

6. The method of claim 1 wherein said phosphate is phosphoric acid.

7. The method of claim 2 wherein said triple super phosphate is present in a range of 5–50% by weight.

8. The method of claim 3 wherein said calcium phosphate is present in a range of 5–50% by weight.

9. The method of claim 4 wherein said single super phosphate is present in a range of 5–50% by weight.

10. The method of claim 5 wherein said tri-sodium phosphate is present it a range of 5–50% by weight.

11. The method of claim 6 wherein said phosphoric acid is present in a range of 5–50% by weight.

12. The method of claim 1 wherein said coating preparation contains a compound selected from the group consisting of lead reactive chemicals, binders, solvents, pigments or buffering compounds and a mixture thereof.

13. The method of claim 1 wherein removal of said coating preparation and said paint containing heavy metal is achieved via a mechanical removal technique.

14. The method of claim 1 wherein removal of said coating preparation and said paint containing heavy metal is achieved via a sand blasting technique.

15. The method of claim 1 wherein said removal is achieved via a media blasting technique and wherein said granular media is substantially composed of particles of a material which has a Mohs scale hardness lower than 3.5.

16. The method of claim 1 wherein said heavy metal is selected from the group consisting of lead, zinc, cadmium, copper, nickel, barium and a mixture thereof.

* * * * *

UNITED STATES PATENT AND TRADEMARK OFFICE
CERTIFICATE OF CORRECTION

PATENT NO. : 5,827,574
DATED : October 27, 1998
INVENTOR(S) : Robert R. Stanforth et al It is certified that error appears in the above-indentified patent and that said Letters Patent is hereby corrected as shown below:

Claim 10, line 2             Delete the word "it" and substitute therefore ---in---

Signed and Sealed this

Fourteenth Day of September, 1999

*Attest:*

Q. TODD DICKINSON

*Attesting Officer*       *Acting Commissioner of Patents and Trademarks*